(12) United States Patent
Honda et al.

(10) Patent No.: US 11,518,398 B2
(45) Date of Patent: Dec. 6, 2022

(54) AGENT SYSTEM, AGENT SERVER, METHOD OF CONTROLLING AGENT SERVER, AND STORAGE MEDIUM

(71) Applicant: HONDA MOTOR CO., LTD., Tokyo (JP)

(72) Inventors: Hiroshi Honda, Wako (JP); Toshikatsu Kuramochi, Tokyo (JP); Yusuke Oi, Tokyo (JP); Mototsugu Kubota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 359 days.

(21) Appl. No.: 16/820,754

(22) Filed: Mar. 17, 2020

(65) Prior Publication Data

US 2020/0317215 A1 Oct. 8, 2020

(30) Foreign Application Priority Data

Mar. 22, 2019 (JP) .............................. JP2019-054880

(51) Int. Cl.
*G10L 15/30* (2013.01)
*B60W 50/10* (2012.01)
*G10L 15/32* (2013.01)

(52) U.S. Cl.
CPC ............. *B60W 50/10* (2013.01); *G10L 15/30* (2013.01); *G10L 15/32* (2013.01); *B60W 2540/21* (2020.02)

(58) Field of Classification Search
USPC .................................. 704/246, 247, 251, 252
See application file for complete search history.

(56) References Cited

U.S. PATENT DOCUMENTS

| 2021/0146934 A1* | 5/2021 | Inagaki | ................ B60K 28/066 |
| 2022/0005470 A1* | 1/2022 | Sugihara | .................. H04S 7/302 |
| 2022/0084331 A1* | 3/2022 | Matsunaga | ............ H04W 12/06 |

FOREIGN PATENT DOCUMENTS

JP 2006-335231 12/2006

* cited by examiner

*Primary Examiner* — Leonard Saint-Cyr
(74) *Attorney, Agent, or Firm* — Amin, Turocy & Watson, LLP

(57) ABSTRACT

According to an embodiment, an agent system includes: a plurality of agent functions mounted on a plurality of different objects and configured to each provide a service which includes a service for causing an output to output a response by a voice in response to a speech of a user; and an information provider configured to include attribute information associated with the same kind of agent function in response content by the same kind of agent function and provide the attribute information to a portable mobile terminal of the user when the same kind of agent function is in the plurality of objects among the plurality of agent functions.

11 Claims, 11 Drawing Sheets

260

| USER ID | VEHICLE ID | ATTRIBUTE INFORMATION | AGENT SETTING INFORMATION ||
|---|---|---|---|---|
| | | | AGENT IMAGE INFORMATION | AGENT VOICE INFORMATION |
| U1 | V001 | AAA | CharacterA | VoiceA |
| U1 | V002 | BBB | CharacterB | VoiceB |
| U2 | V003 | CCC | CharacterC | VoiceC |
| ... | ... | ... | ... | ... |

AGENT SYSTEM, AGENT SERVER, METHOD OF CONTROLLING AGENT SERVER, AND STORAGE MEDIUM

CROSS-REFERENCE TO RELATED APPLICATION

Priority is claimed on Japanese Patent Application No. 2019-054880, filed Mar. 22, 2019, the content of which is incorporated herein by reference.

BACKGROUND

Field of the Invention

The present invention relates to an agent system, an agent server, a method of controlling the agent server, and a storage medium.

Description of Related Art

In the related art, a technology for an agent function of providing control of a vehicle, information regarding driving support in response to a request from an occupant, other applications and the like while talking with the occupant of the vehicle has been disclosed (for example, see Japanese Unexamined Patent Application, First Publication No. 2006-335231).

SUMMARY

In recent years, mounting a plurality of agent functions on an object such as a vehicle has been implemented. When a certain user owns a plurality of objects on which the agent functions are mounted, whether information is supplied from the agent function mounted on a certain object may not be determined in some cases.

The present invention is devised in view of such circumstances and an objective of the present invention is to provide an agent system, an agent server, a method of controlling the agent server, and a storage medium capable of allowing a user to determine an agent function easily.

An agent system, an agent server, a method of controlling the agent server, and a storage medium according to the present invention adopt the following configurations.

(1) According to an aspect of the present invention, an agent system includes: a plurality of agent functions mounted on a plurality of different objects and configured to each provide a service which includes a service for causing an output to output a response by a voice in response to a speech of a user; and an information provider configured to include attribute information associated with the same kind of agent function in response content by the same kind of agent function and provide the attribute information to a portable mobile terminal of the user when the same kind of agent function is in the plurality of objects among the plurality of agent functions.

(2) In the agent system according to the aspect (1), the plurality of objects may include a vehicle associated with the user.

(3) In the agent system according to the aspect (2), the attribute information may include information regarding the vehicle.

(4) The agent system according to the aspect (2) may further include a setter configured to set an output aspect of the response in a predetermined agent function among the plurality of agent functions.

(5) In the agent system according to the aspect (4), the predetermined agent function may be an agent function capable of controlling the vehicle.

(6) In the agent system according to the aspect (4), the predetermined agent function may acquire response content of another agent function included in the plurality of agent functions.

(7) In the agent system according to the aspect (4), the predetermined agent function may cause the mobile terminal to output response content acquired from another agent function as proxy for the other agent function.

(8) According to another aspect of the present invention, an agent server includes: an agent function configured to provide a service which includes a service for causing an output to output a response by a voice in response to a speech of a user; and an information provider configured to include attribute information associated with the same kind of agent function in response content by the same kind of agent function and provide the attribute information to a portable mobile terminal of the user when the agent functions are mounted on a plurality of objects associated with the user and the agent functions mounted on the plurality of objects are the same kind of agent function.

(9) According to still another aspect of the present invention, there is provided a method of controlling an agent server, the method causing a computer to activate an agent function: to provide a service which includes a response in accordance with a speech of a user as a function of the activated agent function; and to include attribute information associated with the same kind of agent function in response content by the same kind of agent function and provide the attribute information to a portable mobile terminal of the user when the agent functions are mounted on a plurality of objects associated with the user and the agent functions mounted on the plurality of objects are the same kind of agent function.

(10) According to still another aspect of the present invention, a computer-readable non-transitory storage medium that stores a program causing a computer to activate an agent function: to provide a service which includes a response in accordance with a speech of a user as a function of the activated agent function; and to include attribute information associated with the same kind of agent function in response content by the same kind of agent function and provide the attribute information to a portable mobile terminal of the user when the agent functions are mounted on a plurality of objects associated with the user and the agent functions mounted on the plurality of objects are the same kind of agent function.

According to the aspects (1) to (10), a user can be allowed to easily determine an agent function.

DESCRIPTION OF EMBODIMENTS

Hereinafter, embodiments of an agent system, an agent server, a method of controlling the agent server, and a storage medium according to the present invention will be described with reference to the drawings. The agent device is a device that realizes a part or all of an agent system. Hereinafter, an agent device that is mounted in a vehicle and has a plurality of kinds of agent functions will be described as an example of the agent device. The vehicle is an example of an object. The agent function is, for example, a function of supplying various kinds of information which is based on a request (a command) included in a speech of a user while talking with a user of the vehicle, or managing a schedule of the user, or relaying a network service. A function, a process procedure, control, and an output aspect, and content implemented by each of the plurality of kinds of agents may differ. Of the agent functions, the agent may have a function of performing control and the like on devices (for example, devices related to driving control or vehicle body control) in a vehicle.

The agent function is realized, for example, by using a natural language processing function (a function of understanding a text structure or meaning), a dialog management function, a network searching function of searching for other devices via a network or searching a predetermined database owned by an own device, and the like in an integrated manner in addition to a voice recognition function of recognizing a voice of a user (a function of creating text of a voice). Some or all of the functions may be realized in accordance with an artificial intelligence (AI) technology. A part (in particular, a voice recognition function or a natural language processing and analyzing function) of a configuration for realizing these functions may be mounted on an agent server (an external device) capable of communicating with a general-purpose communication device brought in a vehicle M or an in-vehicle communication device of the vehicle M. In the following description, it is assumed that the part of the configuration is mounted on an agent server, and the agent device and the agent server realize an agent system in cooperation. A service providing subject (service entity) that is allowed to virtually appear by an agent device and an agent server in cooperation is referred to as an agent.

<Overall Configuration>

Figure 1:
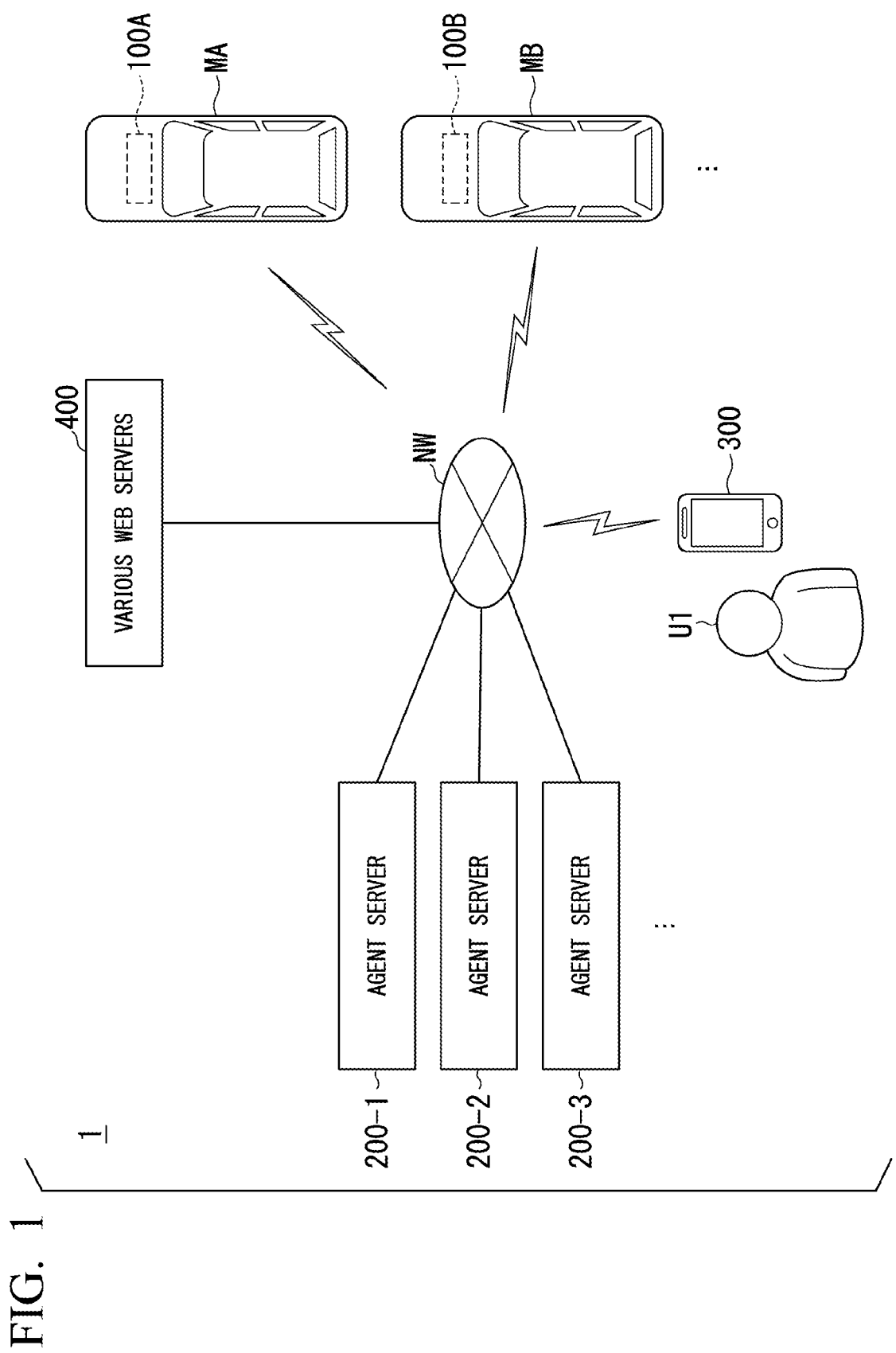
FIG. 1 is a diagram illustrating a configuration of an agent system including an agent device.

FIG. 1 is a diagram illustrating a configuration of an agent system 1 including an agent device 100. The agent system 1 includes, for example, agent devices 100A, 100B, and the like mounted on a plurality of vehicle MA, MB, and the like associated with a user U1, a plurality of agent servers 200-1, 200-2, 200-3, and the like, and a mobile terminal 300 associated with the user U1. The phrase "associated with the user U1" is, for example, equivalent to owning by the user U1, managing by the user U1 or allocating to the user U1. In the above description, numbers after hyphens at the ends of reference numerals serve as identifiers used to distinguish agents from each other. When agent servers are not distinguished from each other, the agent servers are simply referred to as agent servers 200 in some cases and the same applies to other configurations. In FIG. 1, three agent servers 200 are shown, but the number of agent servers 200 may be 2 or may be 4 or more. Each agent server 200 is administrated by, for example, a provider of a mutually different agent system. Accordingly, an agent according to the present invention is an agent that is realized by a mutually different provider. Examples of the provider include an automobile maker, a network service provider, an electronic transaction provider, and a seller and a manufacturer of a mobile terminal. Any entity (a corporation, a group, a person, or the like) can serve as a provider of the agent system.

The agent devices 100A, 100B, and the like have substantially the same function except that the agent devices are mounted on different vehicles MA, MB, and the like. Therefore, when the agent devices are not distinguished from each other, the agent devices are simply referred to as the agent devices 100. When the devices are not distinguished from each other, the vehicles are simply referred to as the vehicles M. In FIG. 1, two agent devices 100 are illustrated, but the number of agent devices may be 3 or more. The agent device 100 communicates with the agent servers 200 via a network NW. The agent server 200 communicates with the mobile terminal 300 via the network NW. The agent device 100 may communicate with the mobile terminal 300 via the network NW. The network NW includes, for example, some or all of the Internet, a cellular network, a Wi-Fi network, a wide area network (WAN), a local area network (LAN), a public network, a telephone network, and a wireless base station. Various web servers 400 are connected to the network NW so that the agent device 100, the agent server 200, or the mobile terminal 300 can acquire web pages from the various web servers 400 via the network NW.

The agent device 100 talks with the user U1, transmits a voice from the user U1 to the agent server 200, and supplies response content which is based on an answer obtained from the agent server 200 to the user U1 in a voice output or image display manner. Here, when the user U1 is in the vehicle, the agent device 100 supplies information using a display or a speaker unit mounted on the vehicle M. When the user U1 is not in the vehicle M, information may be supplied to the mobile terminal 300 of the user U1. The agent device 100 may perform control or the like on the vehicle device 50 based on a request from the user.

First Embodiment

[Vehicle]

Figure 2:
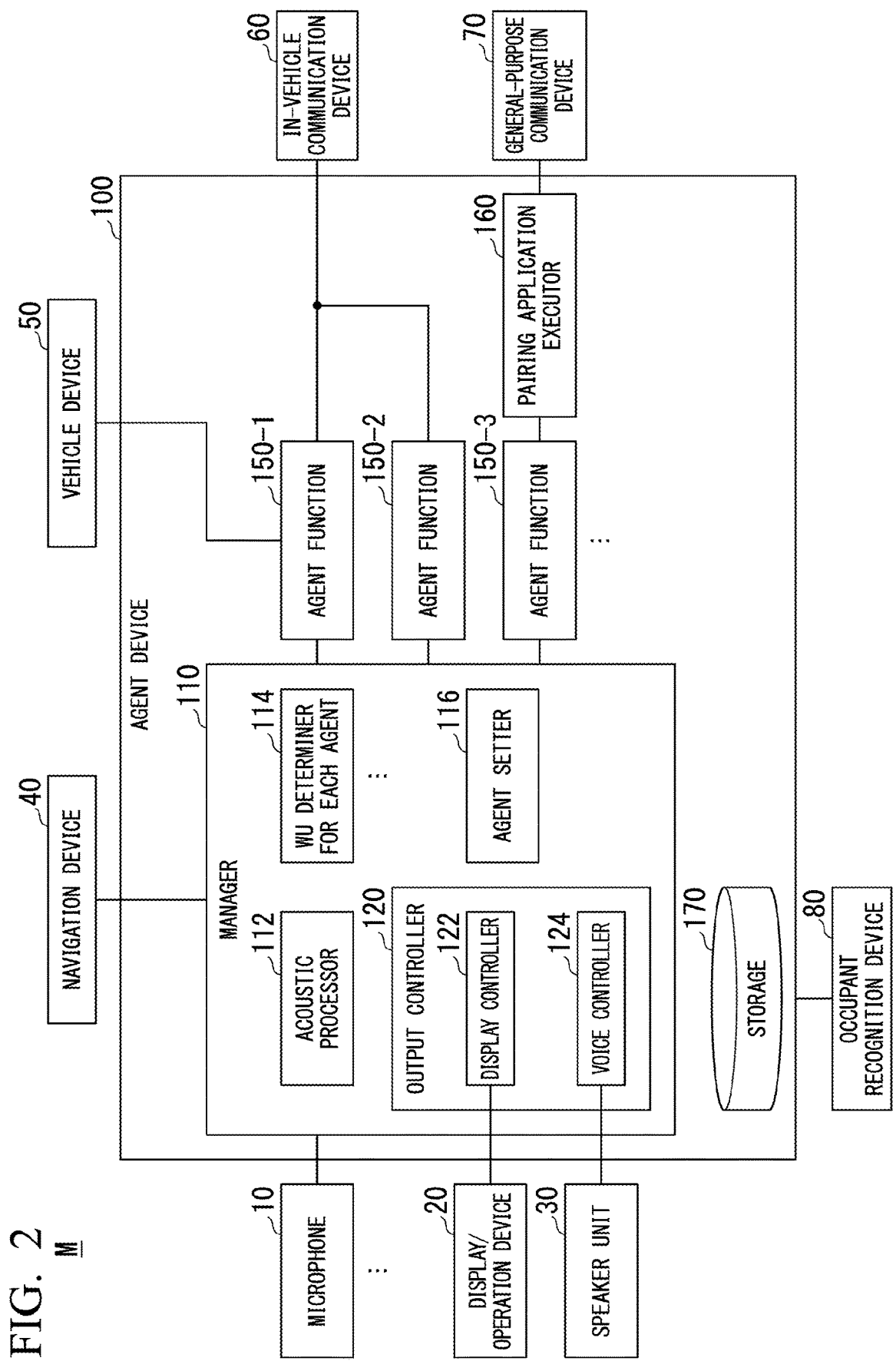
FIG. 2 is a diagram illustrating a configuration of the agent device and devices mounted in a vehicle according to a first embodiment.

FIG. 2 is a diagram illustrating a configuration of the agent device 100 and devices mounted in the vehicle M according to a first embodiment. In the vehicle M, for example, one or more microphones 10, a display operation device 20, a speaker unit 30, a navigation device 40, a vehicle device 50, an in-vehicle communication device 60, an occupant recognition device 80, and the agent device 100 are mounted. A general-purpose communication device 70 such as a smartphone is brought in the vehicle to be used as a communication device in some cases. These devices are connected to each other via a multiplex communication line such as a controller area network (CAN) communication line, a serial communication line, or a wireless communication network. The configuration shown in FIG. 2 is merely exemplary, a part of the configuration may be omitted, and another configuration may be further added. A combination of the display operation device 20 and the speaker unit 30 is an example of an "output."

The microphone 10 is a voice input that collects a speech spoken in the vehicle. The display operation device 20 is a device (or a device group) that can display an image and receive an input operation. The display operation device 20 includes, for example a display device configured as a touch panel. The display operation device 20 may further include a head-up display (HUD) or a mechanical input device. The speaker unit 30 includes, for example, a plurality of speakers (voice outputs) arranged at mutually different positions in the vehicle. The display operation device 20 may be common between the agent device 100 and the navigation device 40. The details thereof will be described later.

The navigation device 40 includes a navigation human machine interface (HMI), a positioning device such as a global positioning system (GPS), a storage device that stores map information, and a control device (a navigation controller) that performs route searching or the like. Some or all of the microphone 10, the display operation device 20, and the speaker unit 30 may be used as the navigation HMI. The navigation device 40 searches for a route (navigation route) for movement from a position of the vehicle M specified by the positioning device to a designation input by a user and outputs guide information using the navigation HMI so that the vehicle M can travel along the route. A navigation server which can be accessed via the network NW may have the route searching function. In this case, the navigation device 40 acquires the route from the navigation server and outputs the guide information. The agent device 100 may be constructed using the navigation controller as a basis. In this case, the navigation controller and the agent device 100 may be integrated as hardware.

The vehicle device 50 is, for example, a device mounted on the vehicle M. The vehicle device 50 includes, for example, a driving power output device such as an engine or a travel motor, a starting motor of the engine, a door lock device, a door opening or closing device, windows, a window opening and closing device and a window opening and closing control device, seats, a seat position control device, a rearview mirror and an angle position control device for the rearview mirror, vehicle interior and exterior lighting devices, a control device for the vehicle interior and exterior lighting devices, a wiper, a defogger, control devices for the wiper and the defogger, side turn signal lamps and a control device for the side turn signal lamps, an air conditioner, and a vehicle information device for information regarding a travel distance, or an air pressure of a tire, information regarding a fuel residual amount, and the like.

The in-vehicle communication device 60 is for example, a wireless communication device that can access the network NW using a cellular network or a Wi-Fi network.

The occupant recognition device 80 includes, for example, a seating sensor, a vehicle interior camera, and an image recognition device. The seating sensor includes a pressure sensor provided in a lower portion of a seat and a tension sensor mounted on a seat belt. The vehicle interior camera is a charge coupled device (CCD) camera or a complementary metal oxide semiconductor (CMOS) camera provided inside the vehicle. The image recognition device analyzes an image of the vehicle interior camera and recognizes presence or absence of an occupant (a user) and a face direction or the like of the occupant on each seat. A recognition result by the occupant recognition device 80 is output to the agent device 100 or the agent server 200.

Figure 3:
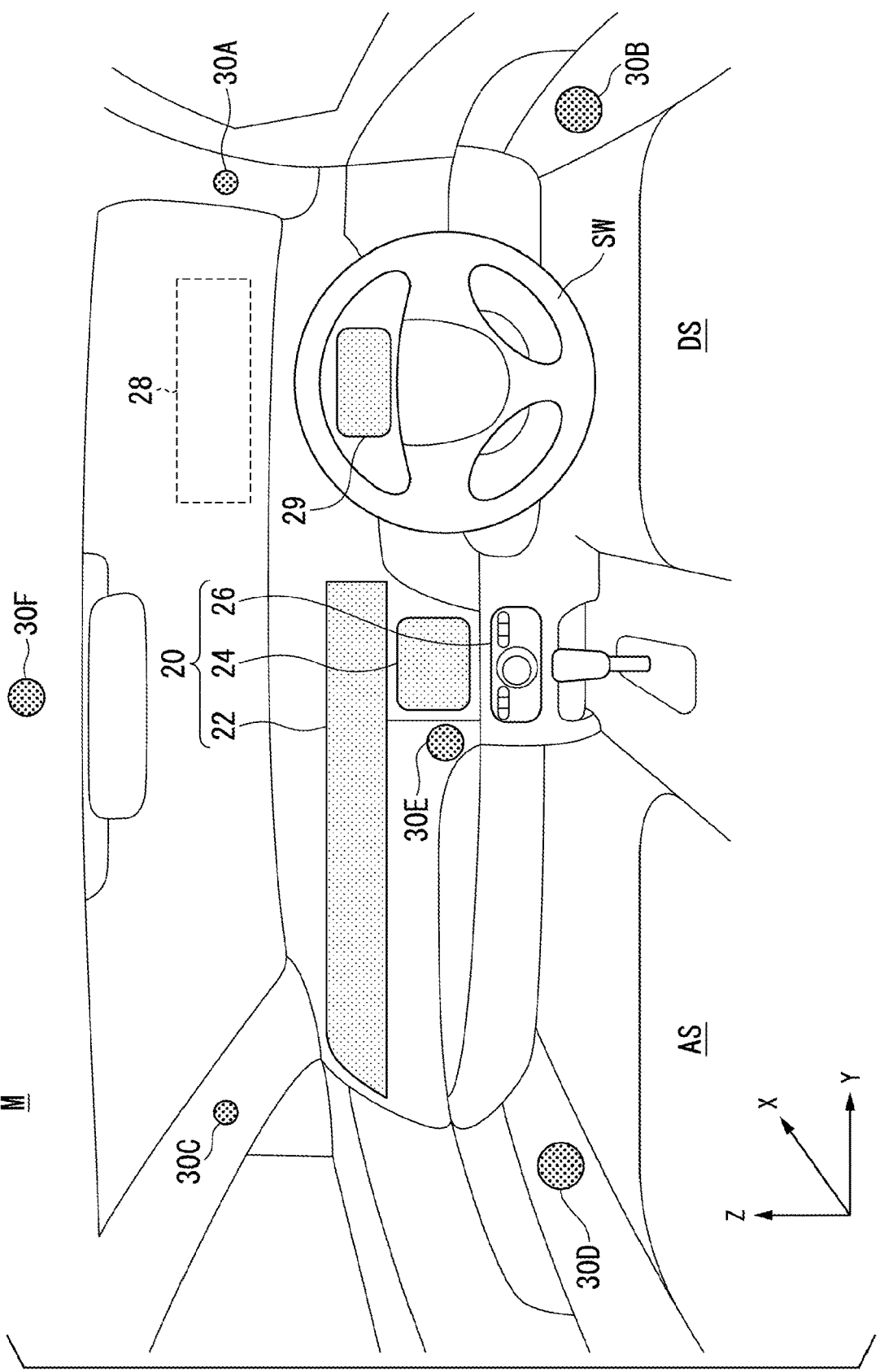
FIG. 3 is a diagram illustrating a disposition example of a display operation device and a speaker unit.

FIG. 3 is a diagram illustrating a disposition example of the display operation device 20 and the speaker unit 30. The display operation device 20 includes, for example, a first display 22, a second display 24, and an operation switch ASSY 26. The display operation device 20 may further include a HUD 28. The display operation device 20 may further include a meter display 29 provided in a portion facing the driver seat DS in the instrument panel. A combination of the first display 22, the second display 24, the HUD 28, and the meter display 29 is an example of a "display."

In the vehicle M, for example, there are a driver seat DS in which a steering wheel SW is provided and a passenger seat AS which is provided in a vehicle width direction (in the drawing, the Y direction) with respect to the driver seat DS. The first display 22 is a display device that has a horizontally long shape extending from the vicinity of the middle between the driver seat DS and the passenger seat AS in the instrument panel to a position facing the left end of the passenger seat AS. The second display 24 is installed near the middle between the driver seat DS and the passenger seat AS in the vehicle width direction and below the first display 22. For example, both the first display 22 and the second display 24 are configured as touch panels and include a liquid crystal display (LCD), an organic electroluminescence (EL) display, and a plasma display as displays. The operation switch ASSY 26 is an integration of a dial switch, a button type switch, and the like. The HUD 28 is, for example, a device that causes a landscape to superimpose on an image so that an occupant can view the image and allows the occupant to view a virtual image, for example, by projecting light including the image to a front windshield or a combiner of the vehicle M. The meter display 29 is, for example, an LCD or an organic EL display and displays indicators such as a speed indicator and a rotation speed indicator. The display operation device 20 outputs content of an operation performed by an occupant to the agent device 100. Content displayed by the above-described displays may be determined by the agent device 100.

The speaker unit 30 includes, for example, speakers 30A to 30F. The speaker 30A is provided in a window pillar (a so-called A pillar) on the side of the driver seat DS. The speaker 30B is installed in a lower portion of a door close to the driver seat DS. The speaker 30C is installed in a window pillar on the side of the passenger seat AS. The speaker 30D is installed in a lower portion of a door close to the passenger seat AS. The speaker 30E is installed near the second display 24. The speaker 30F is installed on a ceiling (roof) of the vehicle interior. The speaker unit 30 may be installed in a lower portion of a door close to a right back seat or a left back seat.

In the disposition, for example, when only the speakers 30A and 30B are caused to output sounds, a sound image is localized near the driver seat DS. The phrase "the sound image is localized," means, for example, determining a spatial position of a sound source felt by an occupant by adjusting the volume of a sound which is delivered to the right and left ears of the occupant. When only the speakers 30C and 30D are caused to output sounds, a sound image is localized near the passenger seat AS. When only the speaker 30E is caused to output a sound, a sound image is localized near the front of the vehicle interior. When only the speaker 30F is caused to output a sound, a sound image is localized near the upper portion of the vehicle interior. The present invention is not limited thereto and the speaker unit 30 can localize a sound image at any position in the vehicle interior by adjusting distribution of a sound output from each speaker using a mixer or an amplifier.

[Agent Device]

Referring back to FIG. 2, the agent device 100 includes a manager 110, agent functions 150-1, 150-2, and 150-3, and a pairing application executor 160, and a storage 170. The manager 110 includes, for example, an acoustic processor 112, a wake-up (WU) determiner 114 for each agent, an agent setter 116, and an output controller 120. Hereinafter, when the agent functions are not distinguished from each other, the agent functions are simply referred to as the agent functions 150. The three agent functions 150 are merely an example corresponding to the number of agent servers 200 in FIG. 1 and the number of agent functions 150 may be 2 or 4 or more. The software disposition illustrated in FIG. 2 is simply illustrated for description. Actually, for example, the manager 110 may be interposed between the agent functions 150 and the in-vehicle communication device 60 or may be altered to any position. Hereinafter, an agent caused to appear by the agent function 150-1 and the agent server 200-1 in cooperation is referred to as an "agent 1," an agent caused to appear by the agent function 150-2 and the agent server 200-2 in cooperation is referred to as an "agent 2," and an agent caused to appear by the agent function 150-3 and the agent server 200-3 in cooperation is referred to as an "agent 3" in some cases.

Each constituent element of the agent device 100 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device (a storage device including a non-transitory storage medium) such as a hard disk drive (HDD) or a flash memory or may be stored in a detachably mounted storage medium (a non-transitory storage medium) such as a DVD or a CD-ROM so that the storage medium is mounted on a drive device to be installed.

The storage 170 is realized by any of the foregoing various storage devices. The storage 170 stores various kinds of data or programs.

The manager 110 functions when a program such as an operating system (OS) or middleware is executed.

The acoustic processor 112 of the manager 110 receives a sound collected from the microphone 10 and performs acoustic processing on the received sound so that the sound enters a state in which a wakeup word (an activation word) set in advance for each agent is appropriately recognized. Examples of the acoustic processing include noise removal or sound amplification by filtering such as a bandpass filter. The acoustic processor 112 outputs the acoustically processed voice to the WU determiner 114 for each agent or the agent function which is being activated.

The WU determiner 114 for each agent is present to correspond to each of the agent functions 150-1, 150-2, and 150-3 and recognizes a wakeup word determined in advance for each agent. The WU determiner 114 for each agent recognizes a meaning of a voice from the voice subjected to the audio processing (a voice stream). First, the WU determiner 114 for each agent detects a voice section based on a zero-crossing and an amplitude of a voice waveform in the voice stream. The WU determiner 114 for each agent may perform section detection based on voice identification and non-voice identification in units of frames based on a mixed Gaussian mixture model (GMM).

Subsequently, the WU determiner 114 for each agent creates text of a voice in the detected voice section and sets the text as text information. Then, the WU determiner 114 for each agent determines whether the text information of the text corresponds to the wakeup word. When the WU determiner 114 for each agent determines that the text information is the wakeup word, the WU determiner 114 for each agent activates the corresponding agent function 150. A function equivalent to the WU determiner 114 for each agent may be mounted on the agent server 200. In this case, when the manager 110 transmits the voice stream subjected to the audio processing by the acoustic processor 112 to the agent server 200 and the agent server 200 determines that the text information is the wakeup word, the agent function 150 is activated in response to an instruction from the agent server 200. Each agent function 150 may be normally activated and determine the wakeup word personally. In this case, it is not necessary for the manager 110 to include the WU determiner 114 for each agent.

The WU determiner 114 for each agent stops (ends) the agent function that has been activated when an ending word included in a spoken voice is recognized in a similar procedure to the above-described procedure and in a state in which the agent corresponding to the ending word is activated (hereinafter referred to as "during activation" as necessary). When the agent during the activation has not received an input of a voice for a predetermined time or more or receives a predetermined instruction operation of ending the agent, the agent may be stopped.

The agent setter 116 sets an output aspect at the time of responding for each agent. The output aspect is, for example, one or both of an agent image to be described below and a voice which is caused to be recognized by a hearer (an occupant) when an agent image speaks in a pseudo-manner (hereinafter referred to as an agent voice). The agent setter 116 may set only the agent image or the agent voice associated with a predetermined agent function among the plurality of agent functions 150-1 to 150-3. The predetermined agent function includes, for example, the agent function 150-1 capable of controlling the vehicle M. The phrase "capable of controlling the vehicle M" means, for example, that the vehicle device 50, the navigation device 40, or the display operation device 20 can be controlled. The details of setting content in the agent setter 116 will be described later.

The output controller 120 provides a service or the like to an occupant by outputting information such as response content to a display or a speaker unit 30 in response to an instruction from the manager 110 or the agent function 150. The output controller 120 includes, for example, a display controller 122 and a voice controller 124.

The display controller 122 causes an image to be displayed in at least a partial area of the display in response to the instruction from the output controller 120. Hereinafter, an image related to an agent is assumed to be displayed on the first display 22 in description. The display controller 122 generates an agent image under the control of the output controller 120 and causes the first display 22 to display the generated agent image. The agent image is, for example, an image of a personified agent performing communication with an occupant inside a vehicle. The agent image is, for example, an image that has an aspect talking with an occupant. The agent image may include, for example, a facial image that has an expression or a facial direction recognized by at least an observer (an occupant). For example, the agent image may be an animation in which a part imitating eyes or a nose in a facial area is expressed and an expression or a facial direction is recognized based on the position of the part in the facial area. The agent image may be an agent image which is felt stereoscopically, in which a head image in a 3-dimensional space is included so that a facial direction of an agent is recognized by an observer, and in which an image of a body (a trunk or limbs) is included so that an action, a behavior, a posture, or the like of the agent is recognized. The agent image may be an animation image. For example, the display controller 122 may display the agent image in a display area close to a position of an occupant recognized by the occupant recognition device 80 or may generate and display an agent image with a face facing the position of the occupant.

The voice controller 124 causes some or all of the speakers included in the speaker unit 30 to output voices in response to an instruction from the output controller 120. The voice controller 124 may perform control such that a sound image of an agent voice is localized at a position corresponding to a display position of the agent image by using the plurality of speaker units 30. The position corresponding to the display position of the agent image is, for example, a position at which the occupant is predicted to feel that the agent image speaks the agent voice and, specifically, a position near the display position of the agent image (for example, within 2 to 3 [cm]).

The agent function 150 causes an agent to appear in cooperation with the corresponding agent server 200 and provides a service that includes outputting a response by a voice to an output in accordance with a speech of an occupant of the vehicle. The agent function 150 may include an agent function to which an authority to control the vehicle M (for example, the vehicle device 50) is granted. In the agent function 150, there is an agent function that communicates with the agent server 200 in cooperation with the general-purpose communication device 70 via the pairing application executor 160. For example, an authority to control the vehicle M (for example, the vehicle device 50) is granted to the agent function 150-1. The agent function 150-1 communicates with the agent server 200-1 via the in-vehicle communication device 60. The agent function 150-2 communicates with the agent server 200-2 via the in-vehicle communication device 60. The agent function 150-3 communicates with the agent server 200-3 in cooperation with the general-purpose communication device 70 via the pairing application executor 160.

The pairing application executor 160 performs pairing with the general-purpose communication device 70 through, for example, Bluetooth (registered trademark) to connect the agent function 150-3 to the general-purpose communication device 70. The agent function 150-3 may be connected to the general-purpose communication device 70 through the wired communication using a universal serial bus (USB) or the like.

[Agent Server and Mobile Terminal]

Figure 4:
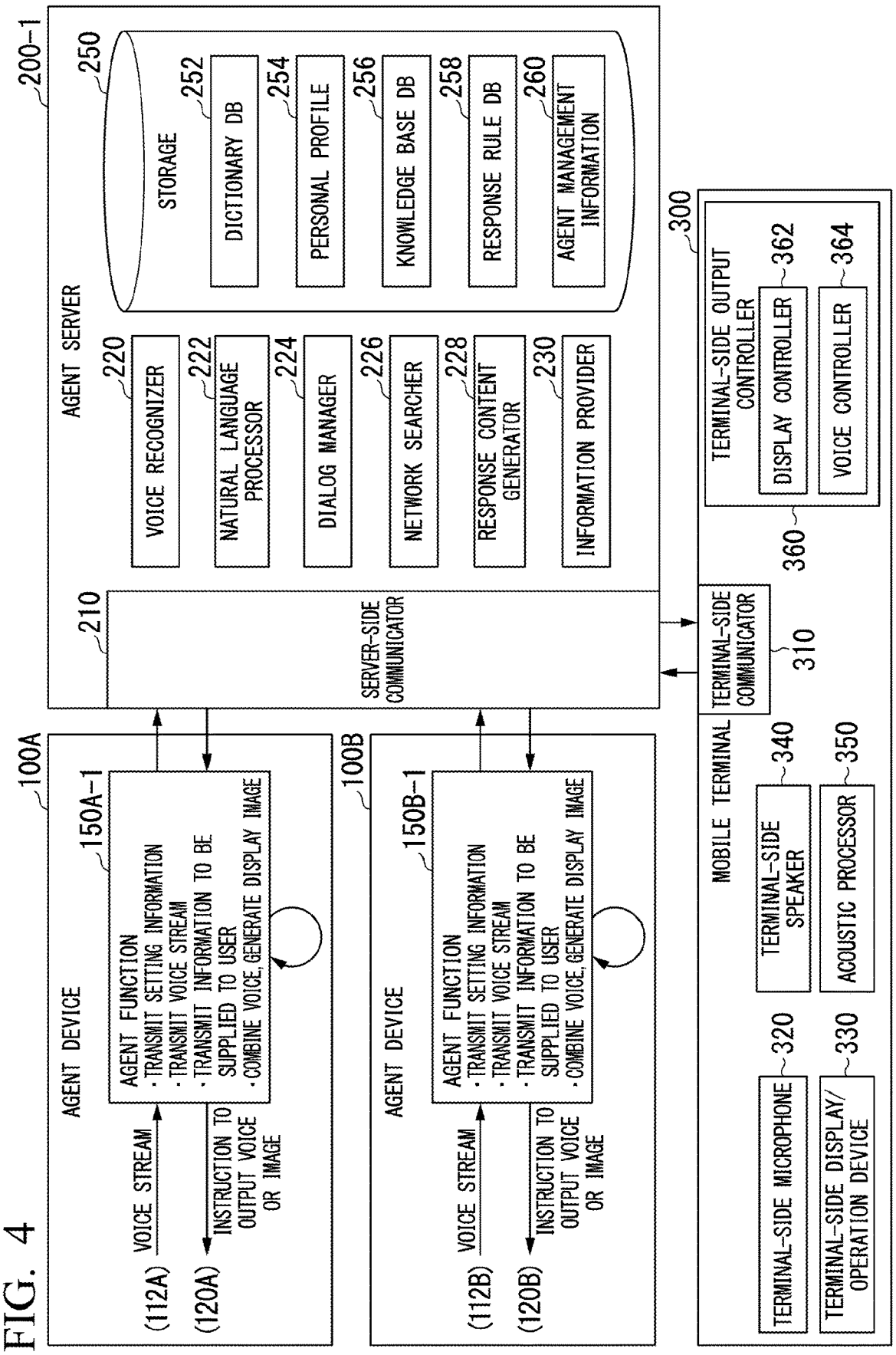
FIG. 4 is a diagram illustrating configurations of an agent server and a mobile terminal and a part of the configuration of the agent device according to a first embodiment.

FIG. 4 is a diagram illustrating configurations of the agent server 200 and the mobile terminal 300 and a part of the configuration of the agent device 100 according to a first embodiment. Hereinafter, operations of the agent functions or the like corresponding to the same kind of agents mounted on vehicles MA and MB will be described along with configurations of the agent server 200 and the mobile terminal 300.

Hereinafter, the agent 1 is assumed to be used as an example of the same kind of agent. Letters "A" and "B" are given to reference numerals of constituents of the agent devices 100A and 100B to identify the respective configurations. Hereinafter, description of physical communication in which the network NW is used will be omitted. Hereinafter, operations of the agent device 100A and the agent server 200-1 will be mainly described.

The agent server 200-1 includes a server-side communicator 210. The server-side communicator 210 is, for example, a network interface such as a network interface card (NIC). Further, the agent server 200-1 further includes, for example, a voice recognizer 220, a natural language processor 222, a dialog manager 224, a network searcher 226, a response content generator 228, an information provider 230, and a storage 250. These constituent elements are realized, for example, by causing a hardware processor such as a CPU to execute a program (software). Some or all of these constituent elements may be realized by hardware (a circuit unit including circuitry) such as an LSI, an ASIC, an FPGA, or a GPU or may be realized by software and hardware in cooperation. The program may be stored in advance in a storage device (a storage device including a non-transitory storage medium) such as an HDD or a flash memory or may be stored in a detachably mounted storage medium (a non-transitory storage medium) such as a DVD or a CD-ROM so that the storage medium is mounted on a drive device to be installed. A combination of the voice recognizer 220 and the natural language processor 222 is an example of a "recognizer."

The storage 250 is realized by any of the foregoing various storage devices. The storage 250 stores, for example, data or programs such as a dictionary database (DB) 252, a personal profile 254, a knowledge base DB 256, a response rule DB 258, and an agent management information 260.

In the agent device 100, the agent function 150A-1 transmits a voice stream input from, for example, the acoustic processor 112 or the like or a voice stream subjected to a process such as compression or encoding to the agent server 200-1. When a command (request content) with which a local process (a process not involved with the agent server 200-1) is possible is recognized, the agent function 150A-1 may perform a process requested with a voice command. The command with which the local process is possible is, for example, a command which can be responded to by referring to a storage 170A included in the agent device 100A. More specifically, the command with which the local process is possible is, for example, a command to search for the name of a specific person from telephone book data which is in the storage 170A and telephone a telephone number associated with a matched name (a command to call a partner). Accordingly, the agent function 150A-1 may have some of the functions included in the agent server 200-1.

When the voice stream is acquired, the voice recognizer 220 performs voice recognition and outputs text information converted into text, and the natural language processor 222 interprets a meaning of the text information while referring to the dictionary DB 252. In the dictionary DB 252, for example, abstracted meaning information of the text information is associated therewith. The dictionary DB 252 may include list information of synonyms. A process of the voice recognizer 220 and a process of the natural language processor 222, are not clearly separated in stages and may influence each other such that the voice recognizer 220 corrects recognition results when receiving processing results of the natural language processor 222.

For example, when a meaning such as "Today's weather" or "How is the weather" is recognized as a recognition result, the natural language processor 222 generates a command for replacing with the standard text information "Today's weather." Thus, even when a variation in text occurs in a voice of a request, a dialog for the request can be facilitated. For example, the natural language processor 222 may recognize a meaning of text information using artificial intelligence processing such as a machine learning process in which a probability is used or may generate a command based on a recognition result.

The dialog manager 224 determines response content (for example, content spoken by an occupant or an image or a voice output from an output) for an occupant of the vehicle M while referring to the personal profile 254, the knowledge base DB 256, and the response rule DB 258 based on an input command. The personal profile 254 includes personal information, interests and preferences, a history of past dialogs, and the like of the user stored for each user (occupant). The personal information of the user includes, for example, address information used to communicate with the mobile terminal 300 of the user. The knowledge base DB 256 is information that defines the relationship between objects. The response rule DB 258 is information that regulates operations which an agent is to perform in response to commands (responses, content of device control, and the like).

The dialog manager 224 may specify a user by combining with the personal profile 254 using feature information obtained from a voice stream. In this case, in the personal profile 254, for example, personal information is associated with feature information of a voice. The feature information of the voice is, for example, information regarding features of a manner of talking such as a pitch, intonation, rhythm (a pattern of sound tones), and the like of a voice or a feature amount according to a Mel Frequency Cepstrum Coefficients or the like. The feature information of the voice is, for example, information obtained by causing a user to speak predetermined words, sentences, or the like at the time of initial registration of the user and recognizing the spoken voices.

The dialog manager 224 causes the network searcher 226 to perform searching when a command requests information searchable for via the network NW. The network searcher 226 accesses the various web servers 400 via the network NW to acquire desired information. The "information searchable for via the network NW" is, for example, an evaluation result by a general user of a restaurant near the vehicle M or weather forecast in accordance with the position of the vehicle M on that day.

The response content generator 228 generates a response sentence and transmits the generated response sentence to the agent device 100 so that the content of the speech determined by the dialog manager 224 is delivered to the occupant of the vehicle M. The response content includes, for example, a response sentence to be supplied to an occupant or a control command for each control target device. The response content generator 228 may acquire a recognition result by the occupant recognition device 80 from the agent device 100 and may generate response content for calling the name of the occupant or having a speaking manner simulating a speaking manner of the occupant when the occupant producing a speech including a command is specified as an occupant registered in the personal profile 254 in accordance with the acquired recognition result.

Figures 5, 6:
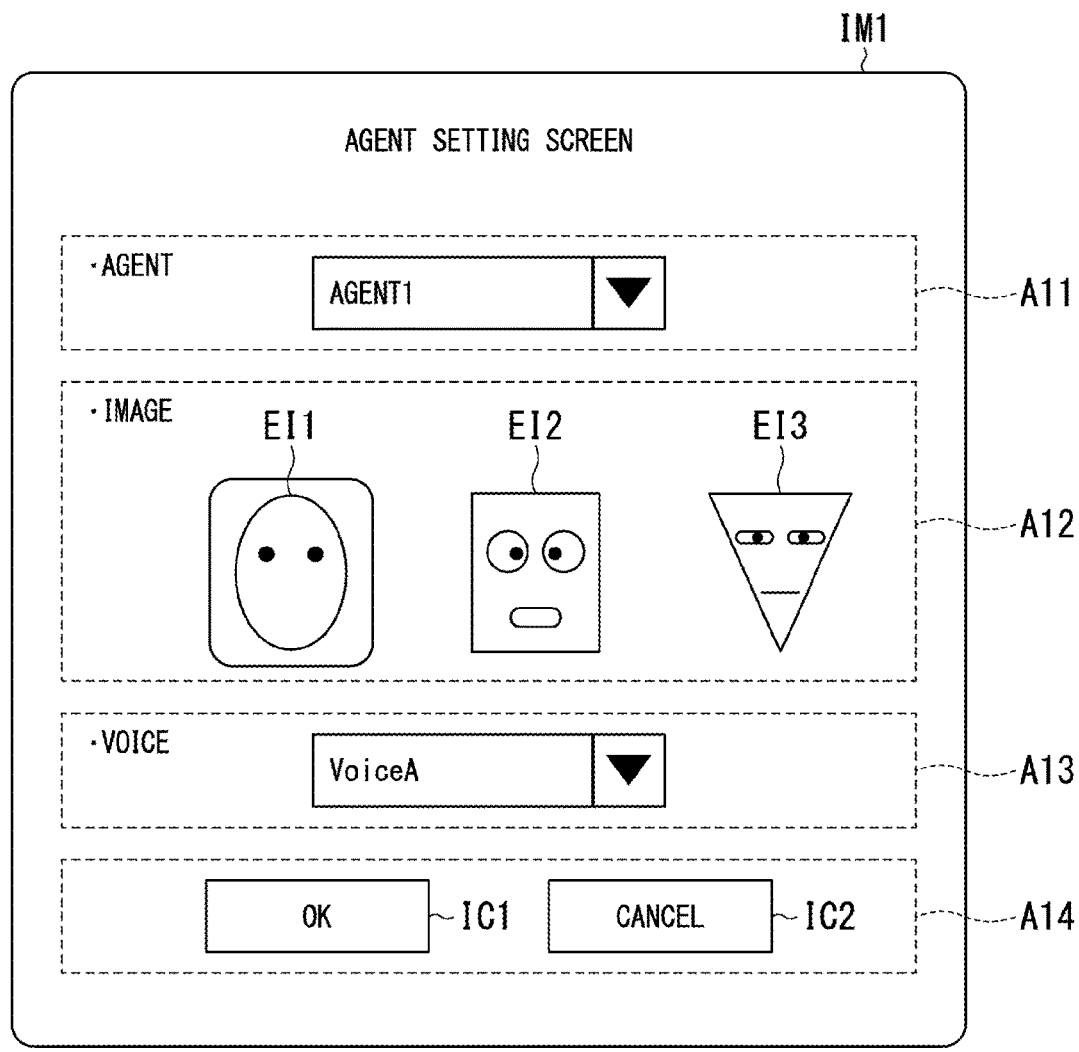
FIG. 5 is a diagram illustrating an example of content of agent management information.
FIG. 6 is a diagram illustrating an example of an image for setting an output aspect of an agent.

The information provider 230 generates response content corresponding to an output aspect of the agent with reference to the agent management information 260 stored in the storage 250 with regard to the response content generated by the response content generator 228. FIG. 5 is a diagram illustrating an example of content of the agent management information 260. In the agent management information 260, for example, attribute information and agent setting information are associated with a user ID which is identification information for identifying a user and a vehicle ID which is identification information for identifying the vehicle M. The attribute information is, for example, identification information for identifying the same kind of agent mounted in a plurality of vehicles associated with the user. The attribute information includes, for example, an automobile registration number written on a vehicle name or a number plate. The attribute information may be information with which the user can specify a vehicle among the plurality of vehicles. Specifically, the attribute information may include information such as an automobile maker, color information or shape information of a vehicle body, and a purchase date. The agent setting information includes, for example, agent image information and agent voice information set by the agent setter 116.

For example, the information provider 230 uses the user ID and the vehicle ID transmitted along with the voice from the agent function 150A-1 to acquire the agent setting information associated with the user ID and the vehicle ID with reference to the agent management information 260 stored in the storage 250. Then, the information provider 230 generates response content corresponding to the agent image and the agent voice of the agent setting information and transmits the generated response content to the agent function 150A-1 which has transmitted the voice.

When the response content is acquired from the agent server 200-1, the agent function 150A-1 instructs the voice controller 124 to output the voice by performing voice combination or the like. The agent function 150A-1 generates an agent image in accordance with the voice output and instructs the display controller 122 to display the generated agent image, an image included in the response result, or the like. In this way, an agent function in which a virtually appearing agent responds to the occupant of the vehicle M is realized.

The information provider 230 is, for example, information which is acquired from the agent function 150-1 and is provided to the user U1. When the user U1 does not board the vehicles MA and MB as a recognition result from the occupant recognition device 80, address information of the mobile terminal 300 is acquired from personal information stored in the personal profile 254 and response content is output to the mobile terminal 300 based on the acquired address information. The information provided to the user U1 is, for example, information of which the user U1 is predicted to be notified promptly, such as information regarding the vehicles or information reserved by a dialog with the user U1. The details of a function of the information provider 230 when information is provided to the mobile terminal 300 will be described later.

The agent server 200-1 performs the above-described functions of the agent function 150A-1 included in the agent device 100A mounted on the vehicle MA and the agent function 150B-1 included in the agent device 100B mounted on the vehicle MB.

[Mobile Terminal]

The mobile terminal 300 is, for example, a portable terminal device on which no agent function is mounted. The mobile terminal 300 is, for example, a smartphone, a tablet terminal, or a wearable terminal. The mobile terminal 300 includes, for example, a terminal-side communicator 310, a terminal-side microphone 320, a terminal-side display operation device 330, a terminal-side speaker 340, a terminal-side acoustic processor 350, and a terminal-side output controller 360. These constituent elements are realized, for example, by causing a hardware processor such as a CPU to execute a program (software). Some or all of these constituent elements may be realized by hardware (a circuit unit including circuitry) such as an LSI, an ASIC, an FPGA, or a GPU or may be realized by software and hardware in cooperation. The program may be stored in advance in a storage device (a storage device including a non-transitory storage medium) such as an HDD or a flash memory or may be stored in a detachably mounted storage medium (a non-transitory storage medium) such as a DVD or a CD-ROM so that the storage medium is mounted on a drive device to be installed.

The terminal-side communicator 310 communicates with the agent server 200 or another external device via the network NW. The terminal-side microphone 320 is a voice input that collects a speech spoken by the user U1. The terminal-side display operation device 330 is a device capable of displaying an image and receiving an input operation. The terminal-side display operation device 330 includes, for example, a display device configured as a touch panel. The terminal-side display operation device 330 includes an LCD, an organic EL display, and a plasma display as a display and includes various buttons or graphical user interface (GUI) switches on a screen as operators. The terminal-side speaker 340 is a voice output that outputs a voice.

The terminal-side acoustic processor 350 receives a sound collected from the terminal-side microphone 320 and performs acoustic processing in which voice recognition can be performed on the received sound on the side of the agent server 200-1. The terminal-side acoustic processor 350 transmits the acoustically processed voice to the agent server 200-1 via the terminal-side communicator 310.

The terminal-side output controller 360 causes the display of the terminal-side display operation device 330 or the terminal-side speaker 340 to output information based on response content input from the agent server 200-1. The terminal-side output controller 360 includes, for example, a display controller 362 and a voice controller 364. The display controller 362 displays various images such as an agent image in at least a partial display area of the display in response to an instruction from the terminal-side output controller 360. The voice controller 364 causes the terminal-side speaker 340 to output various kinds of voices such as an agent voice in response to an instruction from the terminal-side output controller 360.

[Function of Agent Setter]

Hereinafter, a function of the agent setter 116 will be described specifically. For example, when an instruction to set an agent is received through a user operation on the display operation device 20 or when a user uses an agent for the first time, the agent setter 116 causes the display controller 122 to generate an image for setting an output aspect of the agent and causes the display of the display operation device 20 to output the generated image as an agent setting screen.

FIG. 6 is a diagram illustrating an example of an image IM1 for setting an output aspect of an agent. Content, a layout, and the like displayed in the image IM1 are not limited thereto. The image IM1 includes, for example, an agent selection area A11, an agent image selection area A12, a voice selection area A13, and a GUI switch selection area A14. In addition to the above-described areas, the image IM1 may include a setting area in which a user ID, a vehicle ID, and a color and a shape of a vehicle are set, a setting area in which attribute information is set, and a setting area in which the name of an agent is set.

In the agent selection area A11, for example, information used for the user U1 to select an agent setting an output aspect is displayed. For example, when the agents 1 and 2 can be set and the agent 3 cannot be set among the agents 1 to 3, only options of the agents 1 and 2 are displayed in the agent selection area A11. Agents capable of setting (changing) output aspects of the agents include an agent capable of controlling the vehicle M (herein, the agent 1). The agent 1 has higher relevance to the vehicle M than the other agents due to special characteristics that the vehicle can be controlled. Therefore, when the mobile terminal 300 is notified of information regarding the vehicle, a use frequency of the agent 1 is predicted to be high. Accordingly, since the output aspect of the agent 1 can be changed for each vehicle, the user U1 is able to easily determine a vehicle from information output to the mobile terminal 300. In the example of FIG. 6, a pull-down menu (a drop-down menu) is displayed in the agent selection area A11. However, instead of this, an agent may be displayed to be selectable using a GUI such as a list box or a radio button.

In the agent image selection area A12, for example, one or more agent images determined in advance are displayed. In the example of FIG. 6, agent images EI1 to EI3 (characters A to C) are displayed in the agent image selection area A12. The user U1 selects an agent image by touching a display area of one image among the agent images EI1 to EI3. The example of FIG. 6 shows a state in which the agent image EI1 is selected in the agent image selection area A12.

In the voice selection area A13, for example, one or more agent voices determined in advance are displayed. The agent voices include, for example, information for identifying a synthetic voice, and a voice of an actual person such as a voice actor, a celebrity, or a talented person. In the example of FIG. 6, in the voice selection area A13, the pull-down menu (the drop-down menu) is displayed. However, instead of this, an agent voice may be displayed to be selectable using a GUI such as a list box or a radio button.

In the GUI switch selection area A14, various GUI buttons which can be selected by a user are displayed. In the example of FIG. 6, the GUI switch selection area A14 includes, for example, a setting permission button (an OK button) IC1 for permitting setting in content selected in each of the areas A11 to A13 and a cancellation button IC2 for not permitting setting. When the user U1 selects the setting permission button IC1, an output aspect of an agent is set with the content selected in each of the areas A11 to A13. In this case, the agent setter 116 transmits setting information to the agent server 200 corresponding to the agent selected in the agent selection area A11 in association with the user ID, the vehicle ID, the attribute information, and the like determined (or selected) in advance. In the example of FIG. 6, since the agent 1 is selected, setting information (agent image "character A" and agent voice "Voice A") is transmitted to the agent server 200-1 along with a user ID (for example, "U1") of the user U1, a vehicle ID (for example, "V001") of the vehicle MA, and attribute information (for example, a vehicle name "AAA"). The agent server 200-1 causes the storage 250 to store information transmitted by the agent setter 116 as agent management information 260.

For example, when the output aspect (the agent image and the agent voice) set in association with the user ID overlaps the output aspect of another agent of the same vehicle, the agent setter 116 may stops the registration of the setting information and notify the user U1 that the user U1 sets different content again. Thus, it is possible to prevent the plurality of agents mounted on the same vehicle from being not distinguished from each other. Even when the output aspect overlaps the output aspect of the same kind of agent of the other vehicles which have already been registered, the agent setter 116 may perform control such that the setting information is similarly set again.

When the cancellation button IC2 is selected, the agent setter 116 clears the content set in the image IM1. In the above-described example, the example in which the agent image and the agent voice are set has been described. However, for example, an image for setting one of the agent image and the agent voice may be displayed and the displayed content may be set.

[Function of Information Provider]

Next, a function of the information provider 230 will be described specifically. Hereinafter, a function of a response content generator 228 related to the function of the information provider 230 will be also described. For example, when information regarding the vehicle MA is input as information to be provided to the user from the agent function 150A-1, the response content generator 228 generates response content for notifying the user U1 of the information regarding the vehicle MA. The "information regarding the vehicle" includes, for example, at least one of an opening or closing state of a window or a door of the vehicle M, a fuel or battery state (for example, a remaining amount), an ON or OFF state of a light or an indoor lighting, and a recognition result of the occupant recognition device 80.

Here, for example, the agent server 200-1 is assumed to acquire information "Window of back seat is open" from the agent function 150A-1 of the vehicle MA. The agent server 200-1 is assumed to acquire information in which no occupant is in the vehicles MA and MB as recognition results of the occupant recognition devices 80A and 80B mounted on the vehicles MA and MB.

In this case, the information provider 230 causes the mobile terminal 300 of the user U1 to output information regarding the vehicle MA. In this case, the information provider 230 acquires attribute information corresponding to the user ID and the vehicle ID from the agent management information 260 stored in the storage 250 and generates response content including the acquired attribute information. In the example of FIG. 5, when the user ID of the user U1 is "U1" and the vehicle ID of the vehicle MA is "V001," the response content generator 228 generates response content in which an output aspect is agent image "character A" and agent voice "Voice A," generates response content including information regarding attribute information (for example, a vehicle name "AAA"), and transmits the generated response content to the mobile terminal 300.

The terminal-side output controller 360 outputs an image corresponding to the response content transmitted by the agent server 200-1 to the display of the terminal-side display operation device 330 or causes the terminal-side speaker 340 to output a voice corresponding to the response content.

Figure 7:
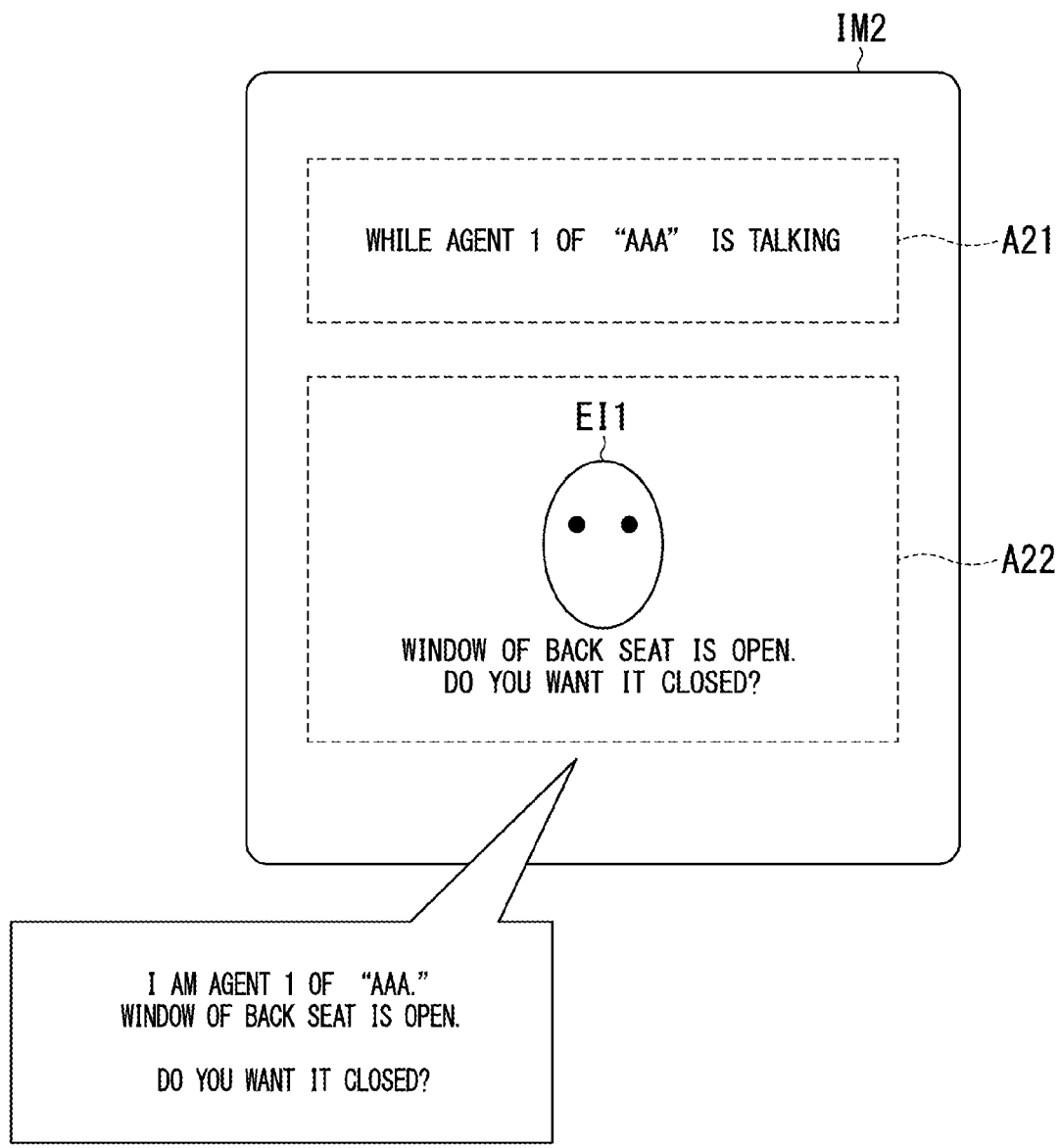
FIG. 7 is a diagram illustrating an example of content in which information is supplied via a mobile terminal.

FIG. 7 is a diagram illustrating an example of content in which information is supplied via the mobile terminal 300.

In the example of FIG. 7, an example in which an image IM2 generated by the display controller 362 and displayed on the display of the terminal-side display operation device 330 and a voice output by the terminal-side speaker 340 is shown. The image IM2 includes, for example, a character information display area A21 and an agent display area A22. In the character information display area A21, for example, information regarding an agent talking with the user U1 is displayed. In the example of FIG. 7, character information "while the agent 1 of "AAA" is talking" is displayed in the character information display area A21.

In the agent display area A22, for example, an agent image associated with the agent while the agent is talking or response content of the agent is displayed. In the example of FIG. 7, the agent image EI1 associated with the agent 1 of the vehicle MA and the user U1 is displayed in the agent display area A22. In this case, as the agent image EI1, the agent image of the agent setting information set for each vehicle is displayed. In the agent display area A22, character information "Window of back seat is open. Do you want it closed?" is displayed as character information corresponding to the response content. The voice controller 364 generates a voice "I am Agent 1 of "AAA." Window of back seat of "AAA" is open. Do you want it closed?" as a voice corresponding to the response content and outputs the generated voice.

In this case, the voice is output as the agent voice associated with the user U1 and the vehicle MA. In this way, by allowing the agent in person to inform the user U1 of the agent of the vehicle by the character information or the agent image displayed in the image and the agent voice, the user U1 can easily determine the talking agent.

When the user U1 speaks "Close" after the provision of the information illustrated in FIG. 7 described above is performed to the mobile terminal 300, the acoustic process is performed on the spoken voice acquired by the terminal-side microphone 320 and the acoustically processed voice is transmitted from the terminal-side communicator 310 to the agent server 200-1. The agent server 200-1 performs voice recognition on the voice received from the mobile terminal 300, generates a command or the like to close the window of the back seat of the vehicle MA as a response which is based on the recognition result, and transmits the generated command to the agent function 150A-1 from the server-side communicator 210. The agent function 150A-1 controls the vehicle device 50 in accordance with the received command and performs control such that the window of the back seat is closed. Thus, the user U1 can give an appropriate instruction to the specified vehicle.

[Process Flow]

Figure 8:
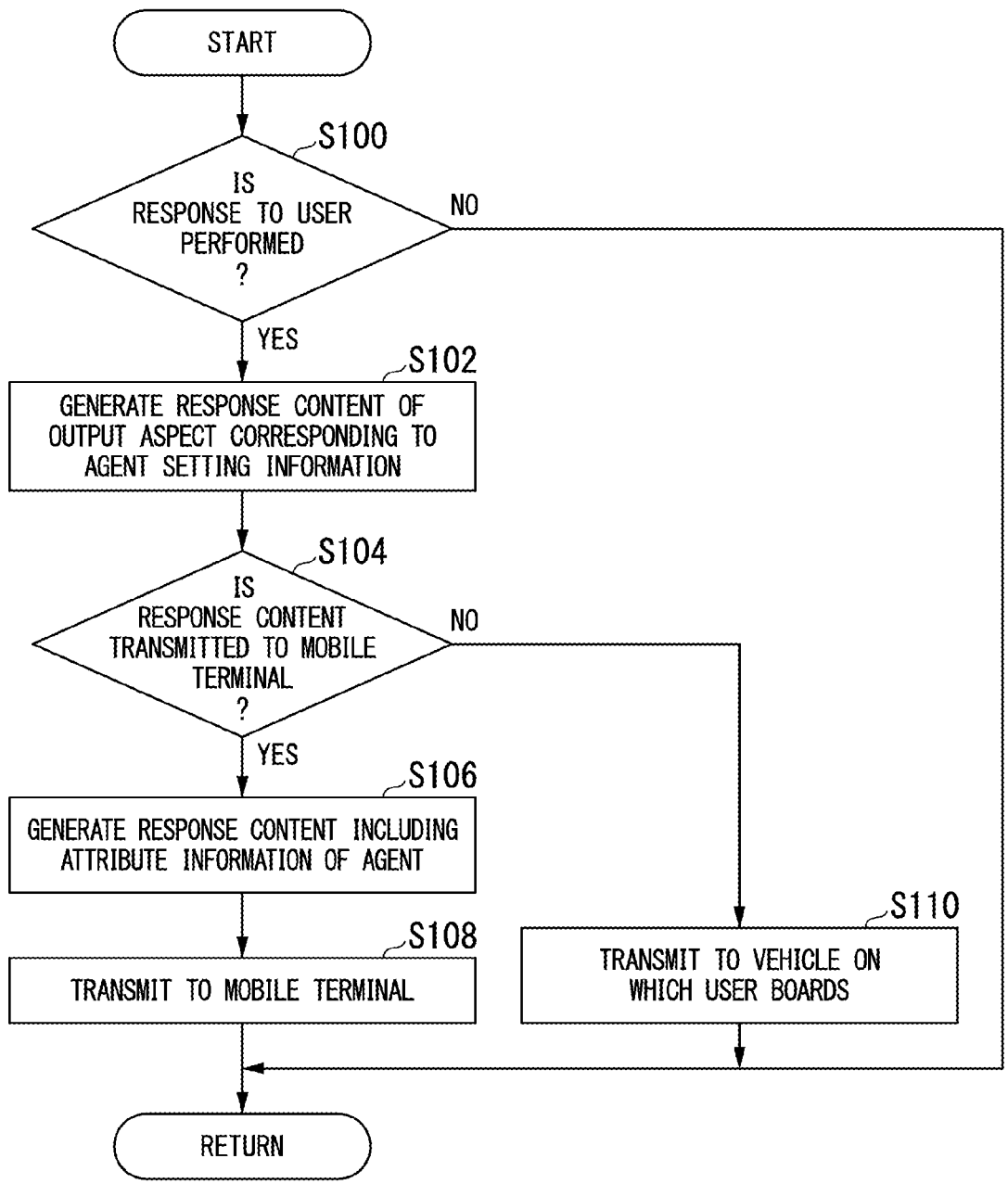
FIG. 8 is a flowchart illustrating an example of a flow of a process performed by the agent system according to the first embodiment.

FIG. 8 is a flowchart illustrating an example of a flow of a process performed by the agent system 1 according to the first embodiment. Hereinafter, the user U1 is assumed to own the mobile terminal 300 and two vehicle MA and MB on which the plurality of agent devices 100A and 100B having the same kind of agent function are mounted. Hereinafter, a process in which information from the agent of the vehicle MA is supplied to the mobile terminal 300 will be mainly described. Hereinafter, the agent image and the agent voice of each agent is assumed to be already set for each vehicle by the agent setter 116. The following process is assumed to be performed repeatedly at a predetermined timing or period.

In the example of FIG. 8, the agent function 150 first determines whether a response to the user U1 is performed (step S100). The response includes not only a case in which taking is in progress but also a case in which information is merely provided. When the response to the user U1 is determined to be performed, the response content generator 228 generates response content of the output aspect corresponding to the agent setting information (the agent image and the agent voice) based on the content of the information provision (step S102). Subsequently, the information provider 230 determines whether to transmit the generated response content to the mobile terminal 300 of the user U1 (step S104). For example, when the user U1 does not board the vehicle MA or MB, the information provider 230 determines to transmit the response content to the mobile terminal 300.

When the response content is determined to be transmitted to the mobile terminal 300, the information provider 230 generates response content including attribute information of the agent (step S106) and transmits the generated response content to the mobile terminal 300 (step S108). As a result, the response content including the attribute information of the agent is output from the mobile terminal 300 and the user U1 can be allowed to easily determine a vehicle of the agent from which the information is supplied.

When it is determined in the process of step S104 that the response content is not transmitted to the mobile terminal 300, the information provider 230 transmits the response content generated by the response content generator 228 to the vehicle on which the occupant boards (step S110). When the response to the user U1 is the information provided from the agent of the vehicle MA and the user U1 boards the vehicle MB (another vehicle), the response content may be output in the output aspect of the same kind of agent of the other vehicle MB, the response content including the attribute information may be generated, and the generated response content may be output. Thus, the process of the flowchart ends. When it is determined in the process of step S100 that the response to the user is not performed, the process of the flowchart ends.

In the agent system 1 according to the above-described first embodiment, when the user owns the plurality of vehicles on which the plurality of agent functions are mounted, and the attribute information of the agent is granted for providing the information from the agent, and thus the user can easily identify on which vehicle the agent is mounted. In the agent system 1 according to the first embodiment, even when no agent function is mounted on the mobile terminal 300, it is possible to realize a dialog in cooperation with the vehicle-side agent.

Second Embodiment

Next, an agent system according to a second embodiment will be described. For example, for an agent mounted on an object, an agent image or an agent voice cannot be changed due to a restriction, an authority, or the like determined for each agent provider in some cases. In this situation, when the information is provided to the mobile terminal 300, an output aspect of the same kind of agent mounted on a plurality of objects is the same. Therefore, the agents of the objects cannot be distinguished from each other in some cases. Accordingly, in the second embodiment, when information from an agent of which an agent image or an agent voice is not set to be distinguishable for each vehicle is provided, an agent (a proxy response agent) which is another agent mounted on an object and is an agent of which an agent image or an agent voice is set provides information by proxy. In an agent system according to the second embodiment, only a configuration of an agent server differs from that of the agent system 1 according to the first embodiment.

Accordingly, a function of an agent server will be mainly described below. In the following description, the same names and reference numerals are given to similar configurations to those of the first embodiment and specific description thereof will be omitted.

Figure 9:
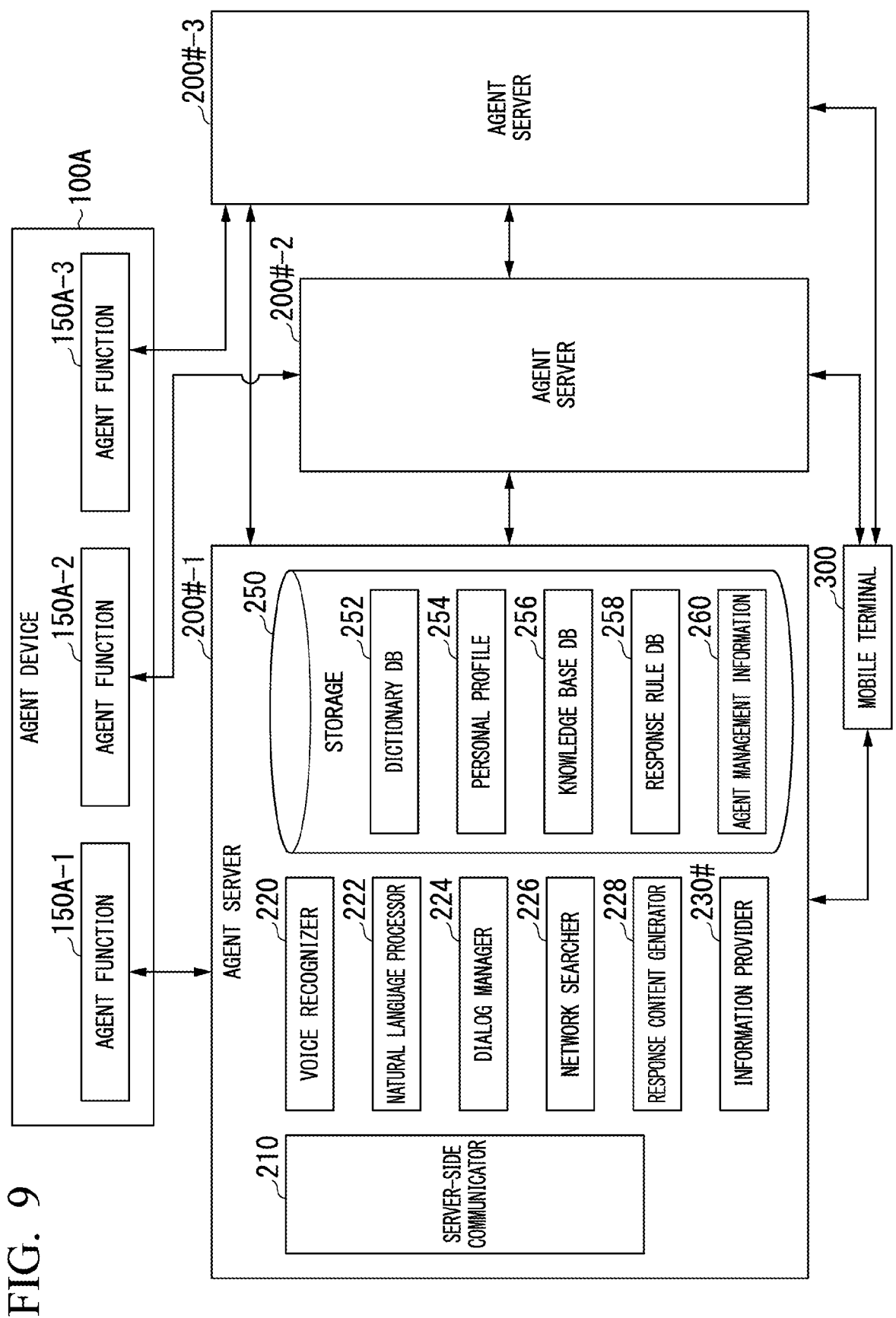
FIG. 9 is a diagram illustrating an example of a configuration of an agent server according to a second embodiment.

FIG. 9 is a diagram illustrating an example of a configuration of an agent server according to the second embodiment. In the example of FIG. 9, for example, agent servers 200#-1 to 200#-3 and agent functions 150A-1 to 150A-3 associated with a plurality of different agents 1 to 3 mounted on the vehicle MA are illustrated. The agent servers 200#-1 to 200#-3 have different executable functions, databases, and the like, but general processes are similar. Therefore, the agent server 200#-1 is used for the description below.

The agent server 200#-1 differs from the agent server 200 of the first embodiment in that, for example, an information provider 230# is included instead of the information provider 230. Accordingly, the information provider 230# will be mainly described below. The information provider 230# has a similar function to the function of the information provider 230 and additionally causes an agent which is another agent mounted on the same vehicle and is an agent in which there is agent setting information for each vehicle to output response content by proxy when the response content is output to the mobile terminal 300 and there is no agent setting information for each vehicle in the agent management information 260.

Specifically, the information provider 230# of the agent server 200#-1 transmits a user ID and a vehicle ID to another agent server (for example, the agent server 200#-2 or 200#-3) to inquire about presence or absence of a proxy response when the response content is output to the mobile terminal 300 and there is no agent setting information for each vehicle in the agent management information 260.

The information provider 230# of the other agent server 200#-2 or 200#-3 determines that the proxy response is possible using the received user ID and vehicle ID with reference to the own agent management information 260 when there is the matched agent management information. The information provider 230# determines that the proxy response is not possible when there is no matched agent management information. Instead of (or in addition to) the above-described example, the user may determine the presence or absence of the proxy response based on a flag set in advance to determine the presence or absence of the proxy response. The presence or absence of the proxy response may also be determined based on transmissibility to the mobile terminal 300. The presence or absence of the proxy response may be determined based on another condition. The information provider 230# of the other agent server 200#-2 or 200#-3 transmits an inquiry result to the agent server 200#-1.

The information provider 230# of the agent server 200#-1 transmits the response content to the agent server permitting the proxy response between the other agent servers 200#-2 and 200#-3 and causes the agent associated with the agent server of a transmission destination to output the response content to the mobile terminal 300. When a response permission is obtained from the plurality of agent servers, the information provider 230# transmits the response content to the agent server having first transmitted the response permission or the agent server with higher priority determined in advance. The information provider 230# may transmit the response content to a specific agent server and cause the agent server to forcibly output the response content by proxy without performing the above-described inquiry to another agent server.

The information provider 230# of the agent server receiving the response content from the agent server 200#-1 causes the mobile terminal 300 to output response content to which the attribute information of the agent, a kind of agent, or the like is granted, to the mobile terminal 300 in an output aspect of the own agent.

Figure 10:
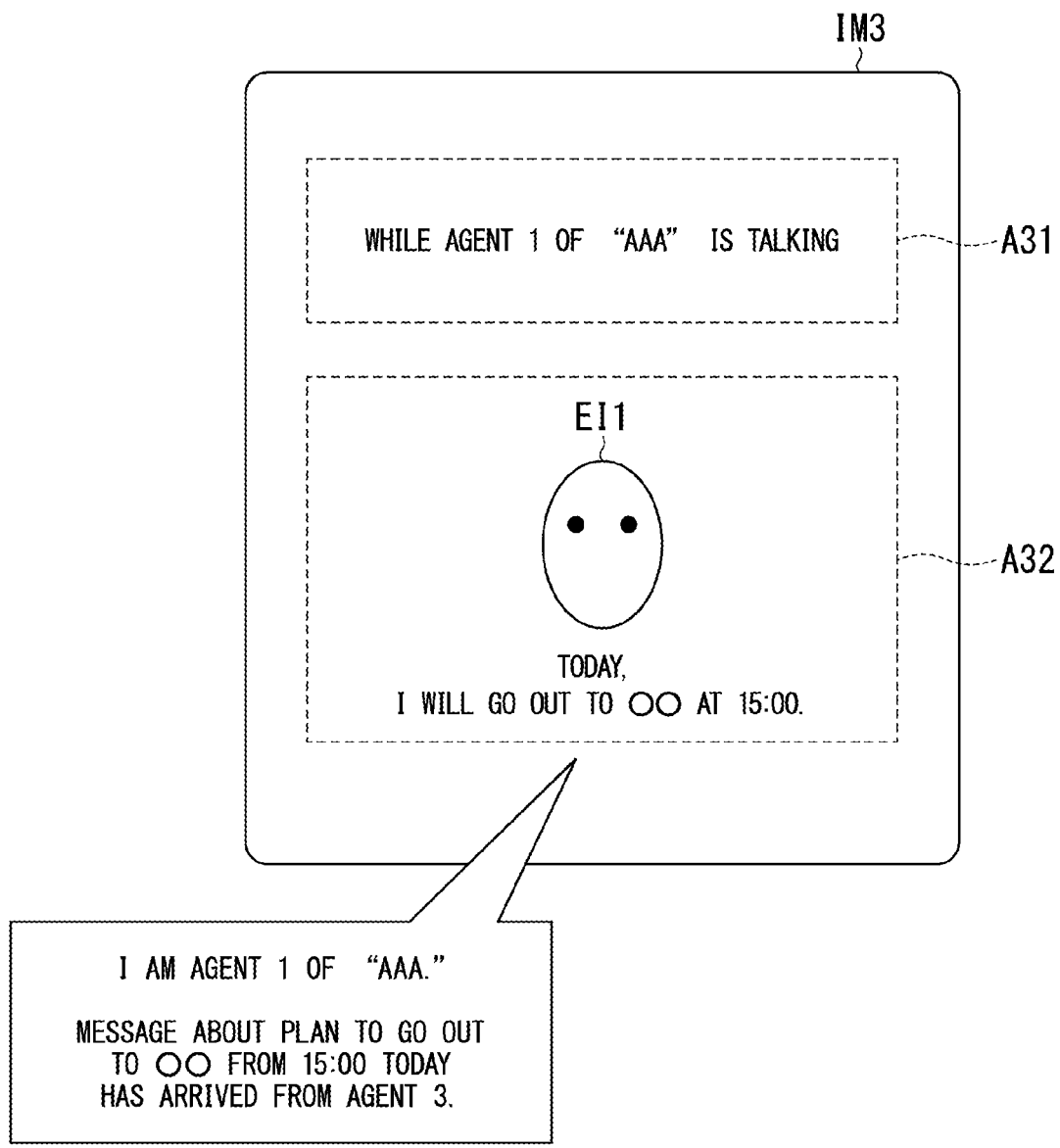
FIG. 10 is a diagram illustrating an example of information output from a mobile terminal according to the second embodiment.

FIG. 10 is a diagram illustrating an example of information output from the mobile terminal 300 according to the second embodiment. FIG. 10 illustrates an example of an image IM3 displayed on the display of the terminal-side display operation device 330 of the mobile terminal 300. The example of FIG. 10 shows a scenario in which response content generated by the agent server 200#-3 of the agent 3 is provided by the agent 1 associated with the agent server 200#-1. The image IM3 includes, for example, a character information display area A31 and an agent display area A32. In the character information display area A31, information regarding an agent that is currently talking is displayed. In the example of FIG. 10, character information "while the agent 1 of "AAA" is talking" is displayed in the character information display area A31.

In the agent display area A32, for example, an agent image that is talking or a response result (information to be provided) is displayed. In the example of FIG. 10, the agent image EI1 corresponding to the agent 1 which notifies the user U1 of the response content instead of the agent 3 and character information "Today, I will go out to OO at 15:00." which is a response result generated by the agent 3 are displayed in the agent display area A32. The response result output in this scenario includes information regarding the own agent including the attribute information, information regarding the agent generating the response content, and the response content generated by the agent. In the example of FIG. 10, a voice "I am Agent 1 of "AAA." and "A message about a plan to go out to OO at 15:00 today has arrived from Agent 3." is output as the voice information of the response result in the agent display area A32.

In the second embodiment, only a predetermined agent may be set to serve as the proxy response agent. In this case, the predetermined agent is, for example, an agent capable of setting an output aspect of the agent. The predetermined agent includes an agent (herein, the agent 1) capable of controlling the vehicle M. For example, the agent 1 is selected as a specific agent that is considered to have higher priority at which the agent performs a proxy response than the other agents or that is forced to perform a proxy response. By causing the agent 1 with high relevance with the vehicle M to perform the proxy response, the user can be allowed to easily determine the vehicle from which the information is provided.

[Process Flow]

Hereinafter, a flow of a process performed by the agent system according to the second embodiment will be described. The process performed by the agent system according to the second embodiment is broadly classified into, for example, a process in which the information provider 230# of the agent server 200# causes another agent server to perform a proxy response and a process in which the own agent performs a proxy response based on response content received from another agent server. Therefore, the classified processes will be described.

Figure 11:
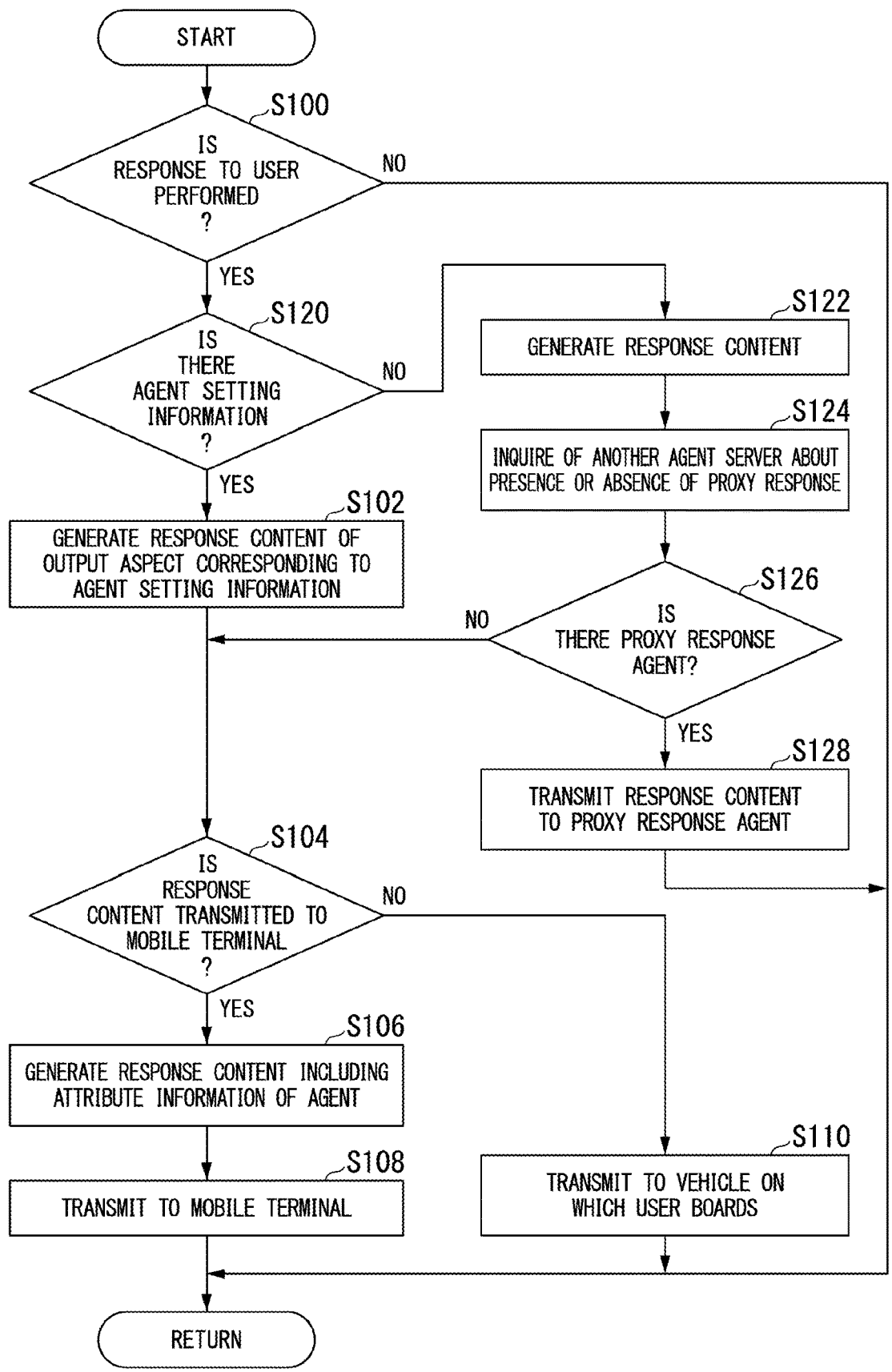
FIG. 11 is a flowchart illustrating an example of a flow of a process in which an agent server allows to another agent server to respond by proxy.

FIG. 11 is a flowchart illustrating an example of a flow of a process in which an agent server 200# allows to another agent server to respond by proxy. The flowchart of FIG. 11 differs from the flowchart of the first embodiment illustrated in FIG. 8, as described above, in that processes of steps S120 to S128 are added. Accordingly, the processes of steps S120 to S128 will be mainly described below. When it is determined in the process of step S100 that the information is provided to the user, the information provider 230# determines whether there is the agent setting information corresponding to the user ID and the vehicle ID in the agent management information 260 (step S120). When it is determined that there is the agent setting information, the processes of steps S102 to S110 are performed.

When it is determined that there is no agent setting information, the response content generator 228 generates response content (step S122). Subsequently, the information provider 230# inquiries of another agent (more specifically, another agent server) mounted on the same vehicle about the presence or absence of the proxy response (step S124). Subsequently, the information provider 230# determines whether there is a proxy response agent from the inquiry result of step S124 (step S126). When it is determined that there is no proxy response agent, the processes of steps S104 to S110 are performed. When it is determined that there is a proxy response agent, the information provider 230# transmits the response content to the proxy response agent (step S128).

Figure 12:
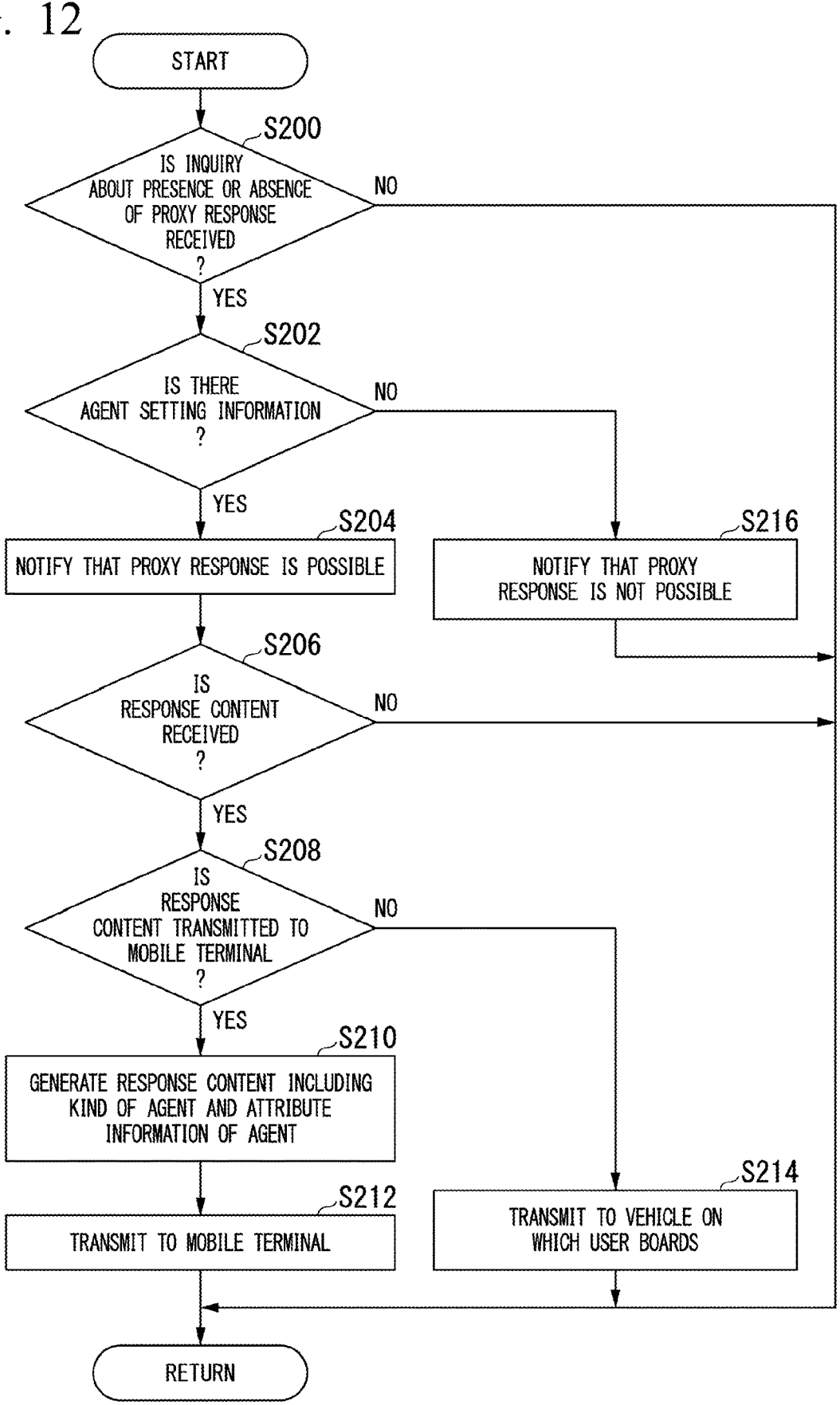
FIG. 12 is a flowchart illustrating an example of a flow of a process in which an own agent responds by proxy based on response content received from another agent server.

FIG. 12 is a flowchart illustrating an example of a flow of a process in which an own agent responds by proxy based on response content received from another agent server. In the example of FIG. 12, the information provider 230# determines whether an inquiry about presence or absence of the proxy response is received from the other agent server (step S200). When the information provider 230# determines that the inquiry about the presence or absence of the proxy response is received, the information provider 230# determines whether there is the agent setting information corresponding to the user ID and the vehicle ID based on the user ID and the vehicle ID acquired as the inquiry information with reference to the agent management information 260 (step S202).

When the information provider 230# determines that there is the agent setting information, the information provider 230# determines that the proxy response is possible and notifies the agent server which has inquired about the fact that the proxy response is possible (step S204). Subsequently, the information provider 230# determines whether the response content is received from the agent server which has notified that the proxy response is possible (step S206). When the information provider 230# determines that the response content is received, the information provider 230# determines whether the received response content is transmitted to the mobile terminal 300 of the user U1 (step S208). When the information provider 230# determines that the response content is transmitted to the mobile terminal 300, the information provider 230# generates response content including the kind of agent generating the attribute information and the response content of the agent (step S210) and transmits the generated response content to the mobile terminal 300 (step S212). As a result, the provided information output by the mobile terminal 300 also includes the kind of agent or the attribute information of the agent, and thus the user U1 can be allowed to easily determine the vehicle and the agent.

When it is determined in the process of step S208 that the response content is not transmitted to the mobile terminal 300, the information provider 230# transmits the response content generated by the response content generator 228 to the vehicle on which an occupant boards (step S214). When it is determined in the process of step S202 that there is no agent setting information, the information provider 230# notifies the agent server which has inquired about the fact that the proxy response is not possible (step S216). Thus, the process of the flowchart ends. The process of the flowchart ends when it is determined in the process of step S200 that the inquiry about the presence or absence of the proxy response is not received or when it is determined in the process of step S206 that the response content is not received.

In the agent system according to the above-described second embodiment, in addition to similar advantages to the advantages of the agent system according to the first embodiment, by causing another agent of the same vehicle to perform the proxy response in accordance with setting situations of output aspects of agents mounted on a plurality of vehicles owned by the user, the user can easily identify information from a vehicle and an agent mounted on the vehicle.

Each of the above-described first and second embodiments may be combined with some or all of other embodiments. Some or all of the functions of the agent device 100 may be included in the agent server 200 (200#). Some or all of the functions of the agent server 200 (200#) may be included in the agent device 100. That is, separation of the functions in the agent device 100 and the agent server 200 (200#) may be appropriately changed depending on constituents of each device, a scale or the like of the agent server 200 (200#), or the agent system. The separation of the functions in the agent device 100 and the agent server 200 (200#) may be set for each vehicle M.

The vehicle has been described as an example of an object in the first and second embodiments. However, instead of (or in addition to) the vehicle, for example, a terminal device installed in a specific location such as an own home or a company or a moving object (for example, a ship, an airplane, a drone, or a motorcycle) including an output other than a vehicle may be used. The mobile terminal 300 according to the above-described embodiments has been described as a mobile terminal on which no agent function is mounted, but the present invention is not limited thereto. One or more agent functions may be mounted on the mobile terminal 300. In this case, a similar function to the above-described agent function 150 is mounted on the mobile terminal 300 and a similar function to the above-described agent is realized via the agent server 200 or the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An agent system comprising:
a plurality of agent functions mounted on a plurality of different objects and configured to each provide a service which includes a service for causing an output to output a response by a voice in response to a speech of a user; and
an information provider configured to include attribute information associated with the same kind of agent function in response content by the same kind of agent function and provide the attribute information to a portable mobile terminal of the user when the same kind of agent function is in the plurality of objects among the plurality of agent functions,
wherein each of the plurality of agent functions is configured to set one or both of a personified agent image or voice that interacts with the user in a different output aspect from the other agent functions,
wherein, when providing the response content to the portable mobile terminal, the information provider outputs the response content from the portable mobile terminal using the personified agent image and voice in the output aspect set in the agent function section associated with the response content; and wherein all constituent elements of the agent system are realized by software and hardware.

2. The agent system according to claim 1, wherein the plurality of objects include a vehicle associated with the user.

3. The agent system according to claim 2, wherein the attribute information includes information regarding the vehicle.

4. The agent system according to claim 2, further comprising:
a setter configured to set the output aspect of the response in a predetermined agent function among the plurality of agent functions.

5. The agent system according to claim 4, wherein the predetermined agent function is an agent function capable of controlling the vehicle.

6. The agent system according to claim 4, wherein the predetermined agent function acquires response content of another agent function included in the plurality of agent functions.

7. The agent system according to claim 4, wherein the predetermined agent function causes the mobile terminal to output response content acquired from another agent function as proxy for the other agent function.

8. The agent system according to claim 1, wherein the information provider outputs information on the agent function that is interacting with the user and the agent function that generated the response content.

9. An agent server comprising:
an agent function configured to provide a service which includes a service for causing an output to output a response by a voice in response to a speech of a user; and
an information provider configured to include attribute information associated with the same kind of agent function in response content by the same kind of agent function and provide the attribute information to a portable mobile terminal of the user when the agent functions are mounted on a plurality of objects associated with the user and the agent functions mounted on the plurality of objects are the same kind of agent function;
wherein each of the plurality of agent functions is configured to set one or both of a personified agent image or voice that interacts with the user in a different output aspect from the other agent functions,
wherein, when providing the response content to the portable mobile terminal, the information provider outputs the response content from the portable mobile terminal using the personified agent image and voice in the output aspect set in the agent function section associated with the response content; and wherein all constituent elements of the agent server are realized by software and hardware.

10. A method of controlling an agent server, the method causing a computer to activate an agent function:

to provide a service which includes a response in accordance with a speech of a user as a function of the activated agent function;

to include attribute information associated with the same kind of agent function in response content by the same kind of agent function and provide the attribute information to a portable mobile terminal of the user when the agent functions are mounted on a plurality of objects associated with the user and the agent functions mounted on the plurality of objects are the same kind of agent function;

for each of the plurality of agent functions, to set one or both of a personified agent image or voice that interacts with the user in a different output aspect from the other agent functions; and when providing the response content to the portable mobile terminal, to output the response content from the portable mobile terminal using the personified agent image and voice in the output aspect set in the agent function section associated with the response content.

11. A computer-readable non-transitory storage medium that stores a program causing a computer to activate an agent function:

to provide a service which includes a response in accordance with a speech of a user as a function of the activated agent function;

to include attribute information associated with the same kind of agent function in response content by the same kind of agent function and provide the attribute information to a portable mobile terminal of the user when the agent functions are mounted on a plurality of objects associated with the user and the agent functions mounted on the plurality of objects are the same kind of agent function;

for each of the plurality of agent functions, to set one or both of a personified agent image or voice that interacts with the user in a different output aspect from the other agent functions; and when providing the response content to the portable mobile terminal, to output the response content from the portable mobile terminal using the personified agent image and voice in the output aspect set in the agent function section associated with the response content.

* * * * *